United States Patent
Nishiyama

(10) Patent No.: US 11,208,230 B2
(45) Date of Patent: Dec. 28, 2021

(54) PRINTING APPARATUS INCLUDING OPTICAL SENSOR LOCATED AT CONVEYING REGION THROUGH WHICH LABEL PASSES

(71) Applicant: BROTHER KOGYO KABUSHIKI KAISHA, Nagoya (JP)

(72) Inventor: Katsuya Nishiyama, Kuwana (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/834,829

(22) Filed: Mar. 30, 2020

(65) Prior Publication Data

US 2020/0407098 A1 Dec. 31, 2020

(30) Foreign Application Priority Data

Jun. 27, 2019 (JP) .............................. JP2019-119692

(51) Int. Cl.
| | |
|---|---|
| *B65C 9/46* | (2006.01) |
| *B65H 43/08* | (2006.01) |
| *B65C 9/40* | (2006.01) |
| *B65C 9/00* | (2006.01) |
| *G01V 8/20* | (2006.01) |

(52) U.S. Cl.
CPC .............. *B65C 9/46* (2013.01); *B65C 9/0006* (2013.01); *B65C 9/40* (2013.01); *B65H 43/08* (2013.01); *G01V 8/20* (2013.01); *B65C 2009/402* (2013.01)

(58) Field of Classification Search
CPC ........... B65C 9/0006; B65C 9/40; B65C 9/46; B65C 2009/402; B65C 2009/404; B65C 2009/408; B65H 43/08; G01V 8/20
See application file for complete search history.

(56) References Cited

U.S. PATENT DOCUMENTS

| | | | | |
|---|---|---|---|---|
| 5,977,533 A | * | 11/1999 | Clayton | .................... G01J 1/44 |
| | | | | 250/205 |
| 2013/0068926 A1 | * | 3/2013 | Okada | ........................ G01J 1/44 |
| | | | | 250/206 |
| 2016/0052316 A1 | * | 2/2016 | Todaka | .................... B41J 29/38 |
| | | | | 347/188 |

FOREIGN PATENT DOCUMENTS

| | | |
|---|---|---|
| JP | S62-141712 U | 9/1987 |
| JP | S62-203010 A | 9/1987 |
| JP | S63-188085 A | 8/1988 |
| JP | S63-189274 A | 8/1988 |
| JP | H04-045061 A | 2/1992 |
| JP | H09-249339 A | 9/1997 |

(Continued)

*Primary Examiner* — George R Koch
(74) *Attorney, Agent, or Firm* — Kenealy Vaidya LLP

(57) ABSTRACT

A printing apparatus includes a casing, an optical sensor, a second light receiving portion and an adjustment part. The optical sensor includes a light emitting portion and a first light receiving portion. The optical sensor is provided at a position in the vicinity of the outlet and located within a conveying region. The conveying region is an area through which the print medium passes. The second light receiving portion is provided in the vicinity of the optical sensor and positioned outside the conveying region where external light is perceivable. The adjustment part is configured to adjust a sensitivity in the detection of the presence of the print medium by the first light receiving portion. Adjustment of the sensitivity of the first light receiving portion is performed based on an intensity of the external light received at the second light receiving portion.

7 Claims, 7 Drawing Sheets

(56) References Cited

FOREIGN PATENT DOCUMENTS

| | | | |
|---|---|---|---|
| JP | 2002-068529 | A | 3/2002 |
| JP | 2006-261524 | A | 9/2006 |
| JP | 2015-136791 | A | 7/2015 |
| JP | 2016-044074 | A | 4/2016 |

* cited by examiner

PRINTING APPARATUS INCLUDING OPTICAL SENSOR LOCATED AT CONVEYING REGION THROUGH WHICH LABEL PASSES

CROSS REFERENCE TO RELATED APPLICATION

This application claims priority from Japanese Patent Application No. 2019-119692 filed Jun. 27, 2019. The entire content of the priority application is incorporated herein by reference.

TECHNICAL FIELD

The present disclosure relates to a printing device.

BACKGROUND

A label creation apparatus described in Japanese Patent Application Publication No. 2015-136791 includes a label-detection sensor for detecting presence/absence of a printed-label discharged from an outlet. The label-detection sensor is located at a position in the vicinity of the outlet and immediately below a label conveyance path through which the printed label passes. The label-detection sensor is a reflective optical sensor and includes a light emitter and a light receiver. Light emitted from the light emitter is reflected upon a label, and the reflected light is received at the light receiver. The label creation apparatus detects the presence/absence of the label at the outlet in accordance with a change in an amount of received light or whether the light receiver has received light.

SUMMARY

As described above, the outlet label-detection sensor is located at a position in the vicinity of the outlet and immediately below the label conveying path where the outlet label-detection sensor is exposed to atmosphere and thus external light is perceivable. As a result, the label creation apparatus could erroneously detect the presence/absence of the label due to incidence of external light to the light receiver.

It is therefore an object of the disclosure to provide a printing apparatus capable of decreasing a likelihood of erroneous detection of presence/absence of a print medium due to external light.

This and other objects will be attained by providing a printing apparatus including a casing, an optical sensor, a second light receiving portion and an adjustment part. The casing is formed with an outlet for discharging a printing medium. The optical sensor includes a light emitting portion and a first light receiving portion. The optical sensor is configured to detect a presence of the print medium. The optical sensor is provided at a position in the vicinity of the outlet and located within a conveying region. The conveying region is an area through which the print medium passes. The second light receiving portion is provided in the vicinity of the optical sensor and positioned outside the conveying region where external light is perceivable. The adjustment part is configured to adjust a sensitivity in the detection of the presence of the print medium by the first light receiving portion. Adjustment of the sensitivity of the first light receiving portion is performed based on an intensity of the external light received at the second light receiving portion.

According to another aspect, the disclosure provides a printing apparatus including a casing, a printing part, a peeling part, a reflective optical sensor, a second light receiving portion and an adjustment part. The casing is formed with an outlet for discharging a printing medium. The printing part is configured to print on a plurality of labels as the printing medium continuously attached to an elongated mount. The peeling part is provided in the vicinity of the outlet and configured to peel off the label from the mount. The reflective optical sensor includes a light emitting portion and a first light receiving portion. The reflective optical sensor is configured to detect a presence of the label. The reflective optical sensor is provided at a position within a label region. The label region is an area in which the label peeled away from the mount is positioned. The second light receiving portion is provided in the vicinity of the optical sensor and provided outside the label region and positioned such that external light can be received. The adjustment part is configured to adjust a sensitivity of the first light receiving portion based on the intensity of the external light received at the second light receiving portion.

BRIEF DESCRIPTION OF THE DRAWINGS

The particular features and advantages of the disclosure will become apparent from the following description taken in connection with the accompanying drawings, in which.

DETAILED DESCRIPTION

<Printing Apparatus 1>

Figure 1:
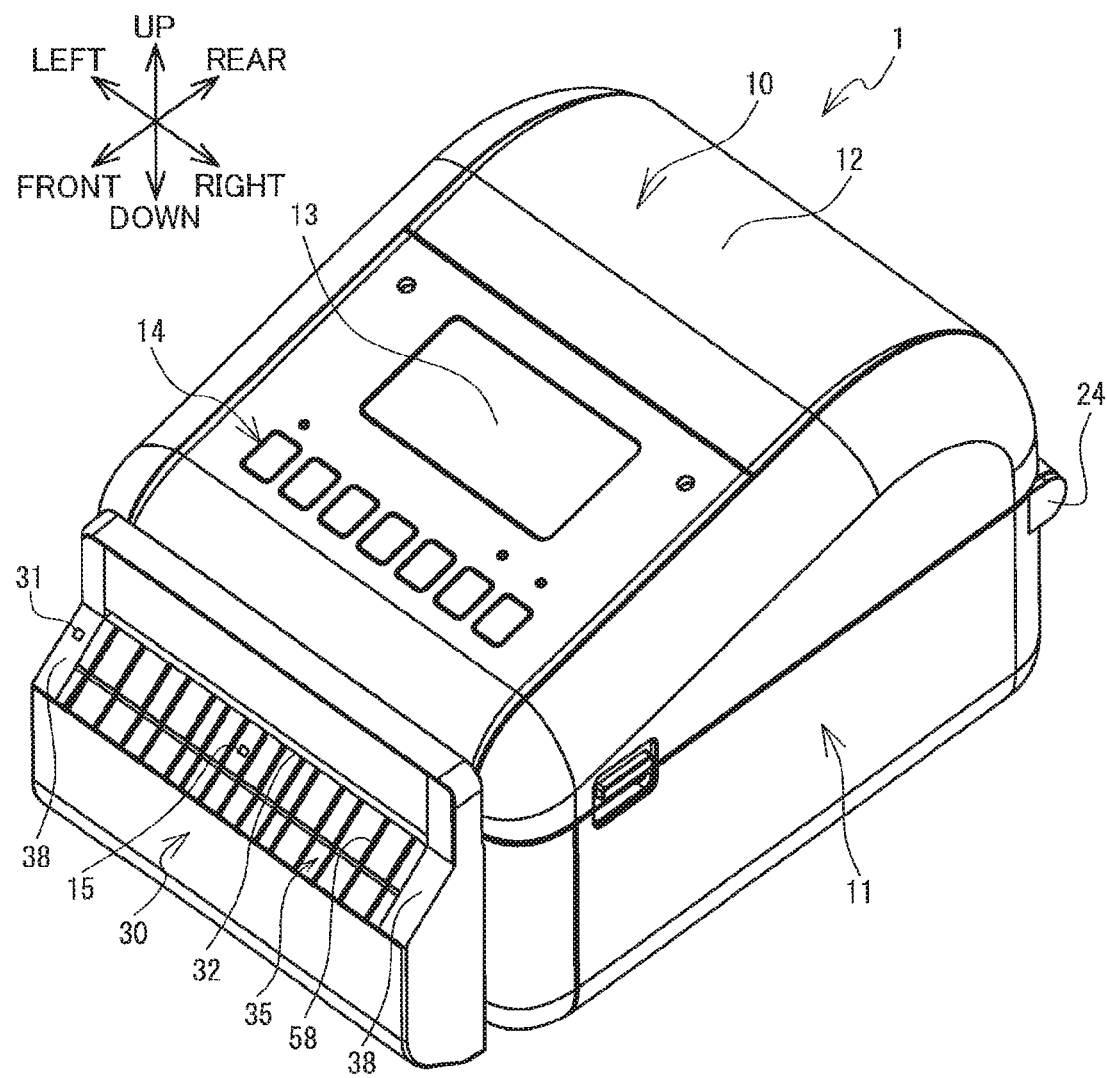
FIG. 1 is a perspective view of a printing device 1 as viewed from above according to one embodiment.

A printing apparatus 1 according to one embodiment will be described with reference to FIGS. 1 through 8. The terms "upward", "downward", "upper", "lower", "above", "below", "beneath", "right", "left", "front", "rear" and the like will be used throughout the description assuming that the printing apparatus 1 is disposed in an orientation in which it is intended to be used. In use, the printing apparatus 1 is disposed as illustrated in FIG. 1. A diagonally downward-right direction, a diagonally upward-left direction, a diagonally upward-right direction, a diagonally downward-left direction, an upward direction, and a downward direction in FIG. 1 are respectively defined as a rightward direction, a leftward direction, a rearward direction, a frontward direction, an upward direction, and a downward direction with reference to the printing apparatus 1.

The printing apparatus 1 is configured to be capable of printing on a label S (see FIG. 3) as a print medium. For example, the label S may consist of a plurality of thermosensitive labels successively peelably adhered to an elongated mount. Specifically, the label S is provided with an adhesive layer on a lower surface thereof and laminated on an upper surface of the mount by an adhesive force of the adhesive layer. The printing apparatus 1 can be connected to an external terminal (not illustrated), e.g., a personal computer. The printing apparatus 1 can print characters such as letters and figures on the label S on a basis of print data received from the external terminal. The label S is an example of "print medium".

As illustrated in FIG. 1, the printing apparatus 1 includes an apparatus body 10, a thermal head 52, a peeling part 30, outer edge portions 38 and a conveying motor 8. The printing apparatus 1 further includes a roll accommodation part (not illustrated) and a platen roller (not illustrated). The apparatus body 10 essentially has a box shape elongated in a front-rear direction. The apparatus body 10 includes a lower housing 11, an upper housing 12 and a shaft 24. The lower housing 11 essentially has a shape of a rectangular-solid box. The lower housing 11 includes an upper portion formed with an opening to open upward. The lower housing 11 corresponds to a lower portion of the apparatus body 10.

The upper housing 12 essentially has a box shape. The upper housing 12 includes a lower portion formed with an opening to open downward. The upper housing 12 corresponds to an upper portion of the apparatus body 10. The upper housing 12 is pivotally movable about the shaft 24. The upper housing 12 is configured to open and close the opening of the lower housing 11 by the pivotal movements about the shaft 24. The upper housing 12 includes an upper surface inclined downward toward the front when the upper housing 12 is closed. The upper housing 12 includes a display part 13 and an operation part 14 both provided on the upper surface thereof. The operation part 14 includes a plurality of buttons for inputting various instructions to the printing apparatus 1. A user operates the operation part 14 while checking the display part 13.

The roll accommodation part (not illustrated) and the platen roller (not illustrated) are provided inside the lower housing 11. The roll accommodation part is a space in which a roll is to be accommodated. The mount on which the label S has been peelably adhered is wound over a tubular core to constitute the roll. The roll is accommodated in the roll accommodation part in an orientation such that the core extends in the left-right direction. The platen roller is a cylindrical roller for conveying the mount on which the label S has been adhered. The platen roller is driven by the conveying motor 8. The platen roller is rotatable about a rotation shaft extending in the left-right direction. For the sake of simplicity, the following descriptions will be provided as the label S is conveyed by the platen roller.

The thermal head 52 (see FIG. 2) is provided inside the upper housing 12. The thermal head 52 extends in the left-right direction. The thermal head 52 includes a plurality of heater elements arranged in the left-right direction.

The peeling part 30 is provided at a front-edge portion of the lower housing 11. The peeling part 30 peels the label S away from the mount and discharges the same. The peeling part 30 includes a discharge outlet 32, a reception part 35, a photo-interrupter 15, a photo-transistor 31, and amount outlet (not illustrated). The discharge outlet 32 is a slit extending in the left-right direction. After printing, the discharge outlet 32 discharges the label S peeled away from the mount out of the printing apparatus 1. The discharged label S is placed on the reception part 35, which is connected to the discharge outlet 32.

The reception part 35 is provided in the vicinity of the discharge outlet 32. The reception part 35 includes an upper surface on which the lower surface of the label S peeled away from the mount is received. The reception part 35 of the peeling part 30 includes edge portions in the left-right direction that are connected to the outer edge portions 38 of the printing apparatus 1. A plurality of minute ribs 58 extending in the front-rear direction is provided on the upper surface of the reception part 35. The outer edge portions 38 lie in a same plane as the reception part 35. Specifically, the outer edge portions 38 includes an upper surface in flush with the upper surface of the reception part 35. The outer edge portions 38 are located in the vicinity of the photo-interrupter 15 and outside the conveying region for the label S discharged through the discharge outlet 32 and are also positioned such that external light can be received.

The photo-interrupter 15 is a reflective optical sensor and provided at the reception part 35. Specifically, the photo-interrupter 15 is located essentially at a center of the reception part 35 in the left-right direction. The photo-interrupter 15 is provided at a position in the vicinity of the discharge outlet 32 through which the label S is discharged, and located within a conveying region through which the label S passes. In other words, the photo-interrupter 15 is provided at a position where the photo-interrupter 15 is covered with the label S discharged through the discharge outlet 32 when this label S is placed on the reception part 35. The photo-interrupter 15 includes alight emitter 15A and a light receiver 15B (see FIG. 3). The photo-interrupter is configured to detect the presence/absence of the label S. A label detection method with the use of the photo-interrupter 15 will be described hereinafter. The photo-interrupter 15 is an example of "optical sensor" and "reflective optical sensor".

The photo-transistor 31 is a sensor used for detecting external light received at the printing apparatus 1. The photo-transistor 31 is provided at the left outer edge portion 38 of the outer edge portions 38. As described above, the outer edge portions 38 are located in the vicinity of the photo-interrupter 15 and outside the conveying region for the label S discharged through the discharge outlet 32 and are also positioned such that external light can be received. Hence, the photo-transistor 31 is provided at a position where the photo-transistor 31 is not covered with the label S but is exposed when the label S is discharged through the discharge outlet 32 and thus placed on the reception part 35. Further, since the photo-transistor 31 is located in the vicinity of the photo-interrupter 15, the external light detected by the photo-transistor 31 has an essentially equal intensity to external light detected by the light receiver 15B. The photo-transistor 31 is an example of "second light receiving portion".

Figure 2:
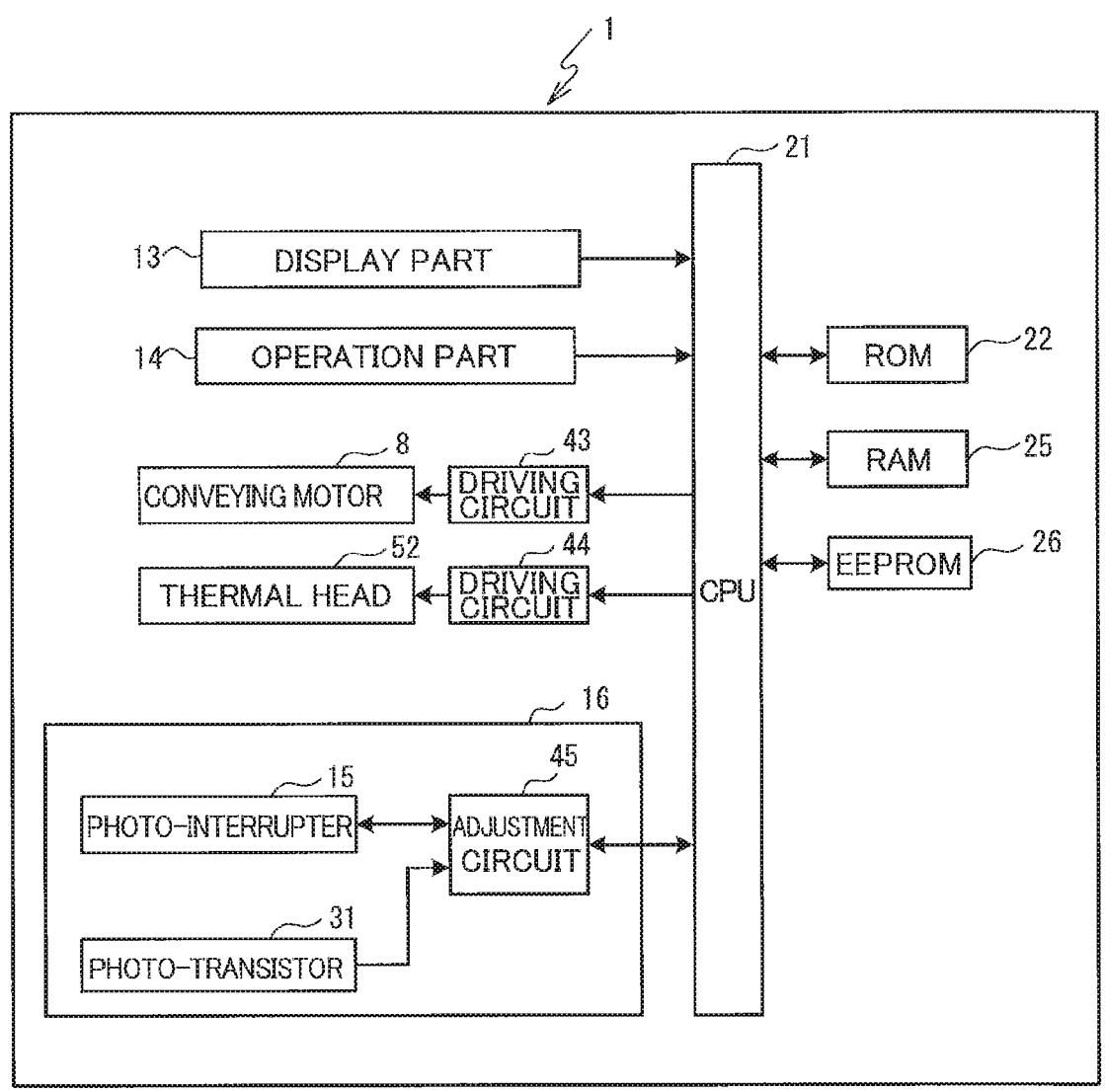
FIG. 2 is a block diagram illustrating an electrical configuration of the printing device 1 according to the embodiment.

The printing apparatus 1 conveys the label S by the platen roller and prints a print image on the label S by the thermal head 52 (see FIG. 2). The label S on which the print image has been printed is conveyed toward the discharge outlet 32. While being conveyed, the label S is peeled away from the mount by the peeling part 30. The peeled label S is discharged out of the apparatus body 10 of the printing apparatus 1 through the discharge outlet 32. The discharged label S is placed over the reception part 35. The mount from which the label S has been peeled is discharged through the mount outlet, which is provided below the peeling part 30. The printing apparatus 1 stops conveying the label S when having discharged the label S through the discharge outlet 32. The thermal head 52 is an example of "printing part".

The label S is held by the adhesive force of the adhesive layer on the lower surface of the label S, so that the label S is pasted only on upper edges of the plurality of ribs 58. That is, an area of contact between the adhesive layer of the label S and the upper surface of the reception part 35 is small, and thus the label S is held by being attached to the upper surface of the reception part 35 by a weak force. Incidentally, the ribs 58 on the upper surface of the reception part 35 may be omitted. Further, emboss processing may be applied to the upper surface of the reception part 35, instead of providing the ribs 58.

When the user removes the label S placed on the reception part 35, i.e., the label S pasted on the reception part 35 by a weak force, the photo-interrupter 15 provided at the reception part 35 detects that the label S is no longer there. In this state, the printing apparatus 1 starts conveying to print on a next label S.

<Electrical Configuration>

The following describes an electrical configuration of the printing apparatus 1 by referring to FIG. 2. The printing apparatus 1 includes a CPU 21, a ROM 22, a RAM 25, an EEPROM 26, driving circuits 43 and 44, and a label detection circuit 16. The CPU 21 serves to control the printing apparatus 1. The ROM 22, the RAM 25, and the EEPROM 26 are electrically connected to the CPU 21. The ROM 22 stores a program to be executed by the CPU 21. The ROM 22 stores a control program for performing a label creation process and a program for performing a process of detecting the label S. The RAM 25 temporarily stores various data read from the ROM. The EEPROM 26 stores print data transmitted from an external terminal (not illustrated) and thresholds A and B described hereinafter.

The CPU 21 is electrically connected to the display part 13 and the operation part 14. The CPU 21 is connected to a conveying motor 8 and the thermal head 52 via respective driving circuits 43 and 44. Under the control of the CPU 21, the driving circuit 43 performs drive control of the conveying motor 8 driving the platen roller. Under the control of the CPU 21, the driving circuit 44 controls energization of the heater elements of the thermal head 52.

The CPU 21 is electrically connected to the label detection circuit 16. The label detection circuit 16 includes the photo-interrupter 15, the photo-transistor 31, and an adjustment circuit 45. The CPU 21 is electrically connected to the photo-interrupter 15 and the photo-transistor 31 via the adjustment circuit 45. Under the control of the CPU 21, the adjustment circuit 45 controls energization of the photo-interrupter 15. Upon the photo-interrupter 15 being energized, the light emitter 15A emits light toward the outside of the apparatus body 10, and the light receiver 15B receives light received at the apparatus body 10. The adjustment circuit 45 receives a signal indicating an intensity of external light received at the photo-transistor 31. On the basis of the intensity of the external light received at the photo-transistor 31, the adjustment circuit 45 adjusts a sensitivity a level in detection of the label S by the light receiver 15B of the photo-interrupter 15. In other words, the adjustment circuit 45 adjusts an outputs of the light receiver 15B based on the intensity of the external light, so that the CPU 21 can accurately determine the presence/absence of the label S without hindrance of the external light. The adjustment circuit 45 is an example of "adjustment part".

Figure 4:
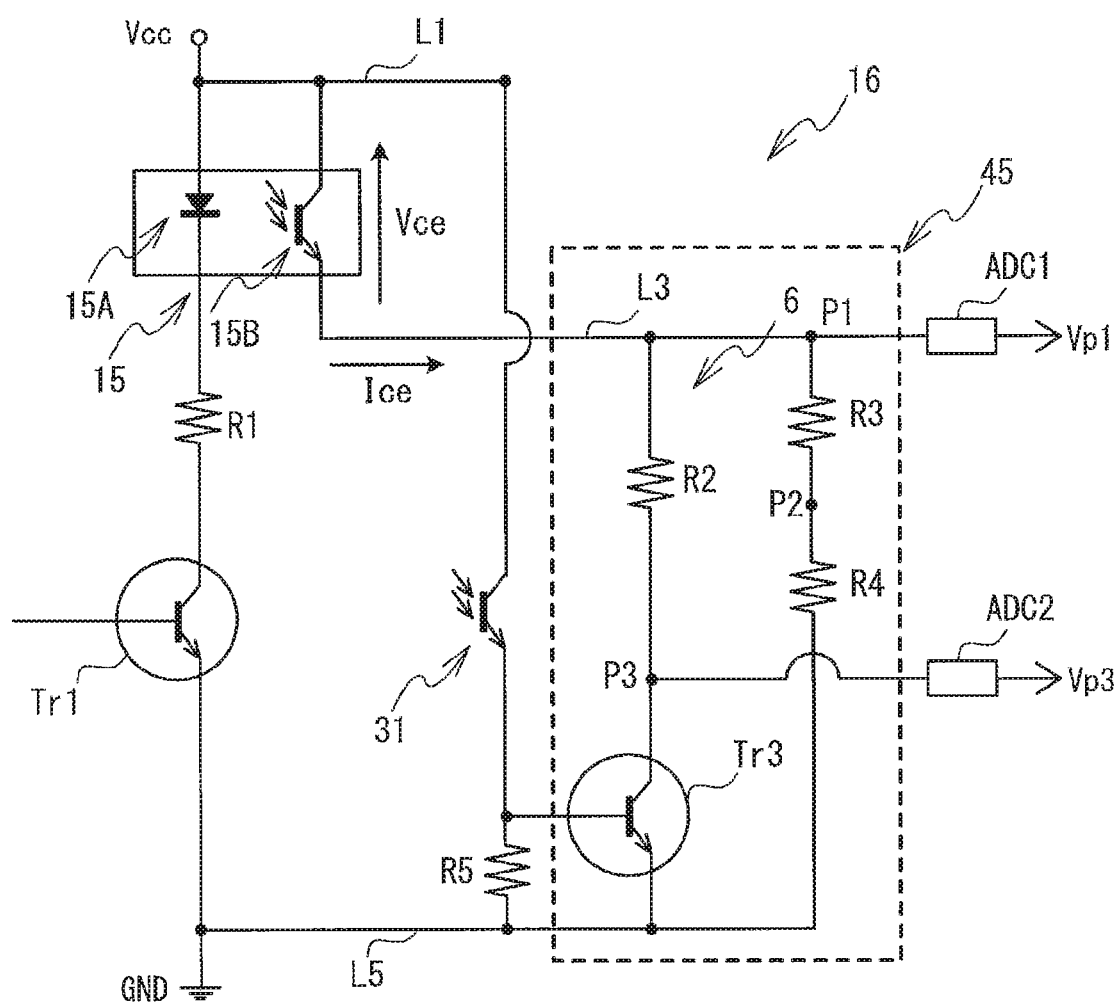
FIG. 4 is a circuit diagram of a label detection circuit 16.

The following describes a circuit configuration of the label detection circuit 16 by referring to FIG. 4. The label detection circuit 16 further includes a transistor Tr1, resistors R1 and R5, and analog-to-digital converters (hereinafter referred to as "ADC 1 and ADC 2"). The adjustment circuit 45 includes a resistive section 6 and a transistor Tr3. The transistor Tr1 has a collector, an emitter and a base. The transistor Tr3 also has a collector, an emitter terminal and a base. The light emitter 15A is a light emitting diode in this embodiment and has a cathode and an anode. The light receiver 15B that is a photo-transistor in this embodiment and has a base, a collector and an emitter.

A voltage Vcc is applied to the anode of the light emitter 15A of the photo-interrupter 15 via a wire L1. The cathode of the light emitter 15A of the photo-interrupter 15 is electrically connected to one end of the resistor R1. The collector of the transistor Tr1 is electrically connected to another end of the resistor R1. The emitter of the transistor Tr1 is electrically connected to ground (GDN). The base of the transistor Tr1 is electrically connected to the CPU 21.

The collector and emitter of the light receiver 15B are switched between a conductive state and a non-conductive state in accordance with light reception. The "conductive state" means that the light receiver 15B, i.e., photo-transistor, is ON. The "non-conductive state" means that the photo-transistor 15B is OFF. The collector of the light receiver 15B of the photo-interrupter 15 is electrically connected to the voltage Vcc via the wire L1. The emitter of the light receiver 15B is electrically connected to the resistive section 6 via a wire L3.

The resistive section 6 includes resistors R2, R3, and R4. One end of the resistor R3 is electrically connected to the emitter of the light receiver 15B via the wire L3 and a connection point P1. Another end of the resistor R3 is electrically connected to one end of the resistor R4 via a connection point P2. Another end of the resistor R4 is electrically connected to ground via a wire L5. As such, the resistors R3 and R4 are connected in series.

One end of the resistor R2 is electrically connected to the emitter of the light receiver 15B via the wire L3. Another end of the resistor R2 is electrically connected to a collector of the transistor Tr3 via a connection point P3. An emitter of the transistor Tr3 is electrically connected to ground via the wire L5. The transistor Tr3 and the resistor R2 of the resistive section 6 are arranged in parallel to the resistors R3 and R4. The resistor R1 is an example of "first resistor". The resistors R2 and R3 are an example of "second resistor".

A collector of the photo-transistor 31 is electrically connected to the voltage Vcc via the wire L1. An emitter of the photo-transistor 31 is electrically connected to a base of the transistor Tr3 and one end of the resistor R5. Another end of the resistor R5 is electrically connected to ground via the wire L5. The ADCs 1 and 2 are respectively connected to the connection points P1 and P3.

<Detection of Label S>

The following describes an influence of external light and relationships between a thickness of the label S and the sensitivity of the light receiver 15B of the photo-interrupter 15. By referring to FIG. 3A, descriptions are given of a situation in which a thin label S is detected. Most of light emitted from the light emitter 15A passes through the thin label S. Hence, light reflected upon the thin label S has a low intensity, and the light receiver 15B outputs a low photo-current Ice. Accordingly, the sensitivity of the light receiver 15B will preferably be adjusted to a high level so that the presence/absence of the thin label S can be determined by the CPU 21 even when little light is incident on the light receiver 15B.

Figure 3A:
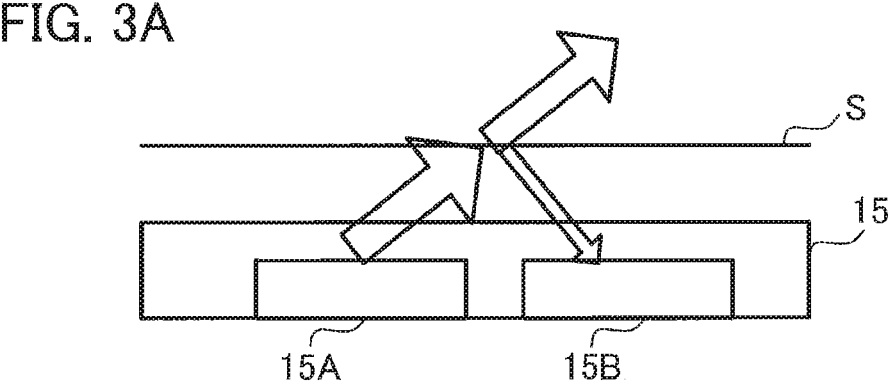
FIG. 3A is a conceptual diagram of light reflected by a label S detected by a photo-interrupter 15 when the label S is a thin label in which a thickness is small.
Figure 3B:
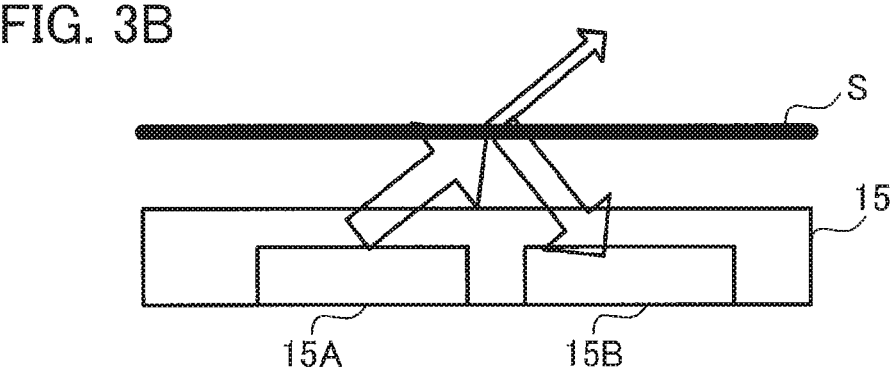
FIG. 3B is a conceptual diagram of light reflected by the label S detected by the photo-interrupter 15 when the label S is a thick label in which a thickness is large.

By referring to FIG. 3B, descriptions are given of a situation in which a thick label S is detected. Most of light emitted from the light emitter 15A is reflected by the thick label S. Hence, light reflected upon the thick label S has a high intensity. The light receiver 15B receives the light with a high intensity. Thus, the light receiver 15B outputs a high photo-current Ice, and output of the light receiver 15B tends to become saturated. Accordingly, the sensitivity of the light receiver 15B will preferably be adjusted to a low level to prevent the output from becoming saturated. In other words, the sensitivity of the light receiver 15B will preferably be adjusted to a low level so that the presence/absence of the thick label S can be determined by the CPU 21 even when high-intensity light is incident on the light receiver 15B.

Figure 3C:
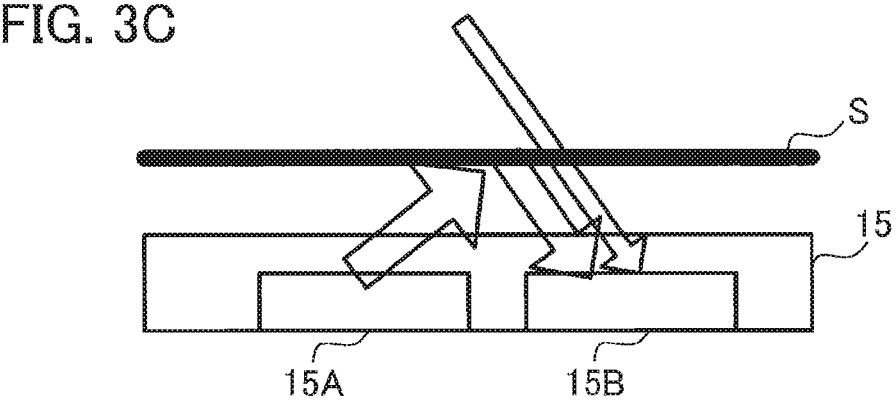
FIG. 3C is a conceptual diagram of light reflected by the label S detected by the photo-interrupter 15 when the label S is the thick label and external light is received by a light receiver 15B.

By referring to FIG. 3C, descriptions are given of a situation in which the label S is thick and external light is received. Most of light emitted from the light emitter 15A is reflected by the thick label S. Hence, light reflected by the thick label S has a high intensity. The light receiver 15B receives the light with a high intensity. In this case, when external light is received, the output of the light receiver 15B will become saturated more easily. Thus, the light receiver 15B will output a higher photo-current Ice, and the output of the light receiver 15B will become saturated. Accordingly, the sensitivity of the light receiver 15B will preferably be adjusted to a low level to prevent the output from becoming saturated. In other words, the sensitivity of the light receiver 15B will preferably be adjusted to a low level so that the presence/absence of the thick label S can be determined by the CPU 21 even when high-intensity light is incident on the light receiver 15B. In order to attain the above-mentioned objects, in the present embodiment, the printing apparatus 1 is configured to adjust a sensitivity of the light receiver 15B in accordance with the intensity of external light.

<Operations of Adjustment Circuit 45>

The following describes operations of the adjustment circuit 45. The adjustment circuit 45 switches a resistance value of the resistive section 6 electrically connected to the transistor Tr3 on the basis of the intensity of light detected by the photo-transistor 31. An ON/OFF state of the transistor Tr3 is switched in accordance with a magnitude of an output current of the photo-transistor 31. Thus, a voltage that corresponds to the magnitude of the output current is applied to the base of the transistor Tr3. While the photo-transistor 31 is receiving external light having an intensity lower than a predetermined intensity, the transistor Tr3 remains in OFF state. When strong external light having an intensity equal to or higher than the predetermined intensity is received, the transistor Tr3 is switched to ON.

Switching the ON/OFF state of the transistor Tr3 causes the transistor Tr3 to switch the resistor R2 between an enabled state and a disabled state. As a result, a combined resistance value of the resistor R2 and the resistors R3 and R4 (the resistance value of the resistive section 6) is switched. The adjustment circuit 45 adjusts the sensitivity of the light receiver 15B in accordance with the resistance value of the resistive section 6 being switched. The transistor Tr3 is an example of "switching section".

When the output current from the photo-transistor 31 is low, the transistor Tr3 remains in OFF state. In this case, the resistor R2 is not electrically connected to the resistors R3 and R4. Thus, resistive components that correspond to a sum of resistance values of the transistors R3 and R4 are present between the wire L3 and the wire L5 (ground). When, for example, the resistance value of the resistor R3 is 7 kΩ and the resistance value of the resistor R4 is kW, the resistance value of the resistive section 6 is equal to (7+8) kΩ=15 kΩ. When the transistor Tr3 is in OFF, the sensitivity of the light receiver 15B is enhanced with an increase in the resistance value of the resistive section 6.

When the output current from the photo-transistor 31 is high, the transistor Tr3 is ON. In this case, the resistor R2 is electrically connected in parallel to the resistors R3 and R4. The resistance value of the resistive section 6 is low in comparison to when only the resistors R3 and R4 are electrically connected in series. When, for example, the resistance value of the resistor R2 is 2.3 kΩ, the resistance value of the resistive section 6 is equal to (2.3×15)/(2.3+15) kΩ≈2 kΩ. When the transistor Tr3 is ON, the sensitivity of the light receiver 15B is reduced with a decrease in the resistance value of the resistive section 6.

<Operations of Label Detection Circuit 16>

The following describes operations of the label detection circuit 16 by referring to FIG. 4. When detecting the label S, the CPU 21 controls the label detection circuit 16. First, the CPU 21 controls the transistor Tr1 in the ON state. In accordance with the transistor Tr1 being turned ON, the light emitter 15A of the photo-interrupter 15 emits light (see FIG. 4).

When the label S is not located over the reception part 35, the light receiver 15B receives only external light. When the label S is located over the reception part 35, the light emitted from the light emitter 15A is reflected upon the label S, and the light receiver 15B receives the light reflected upon the label S. In this case, light received from the light receiver 15B includes external light and the reflected light.

Figure 5:
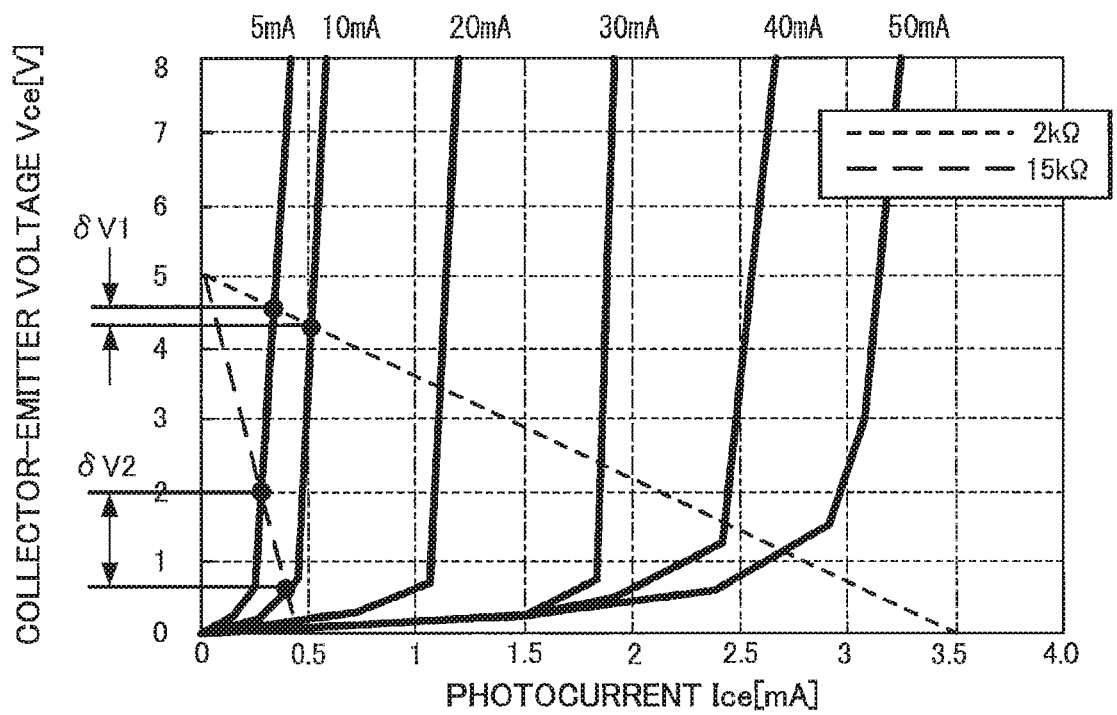
FIG. 5 is a view illustrating a first example of a relationship between a collector-emitter voltage of the photo-interrupter 15 and a photo-current.
Figure 6:
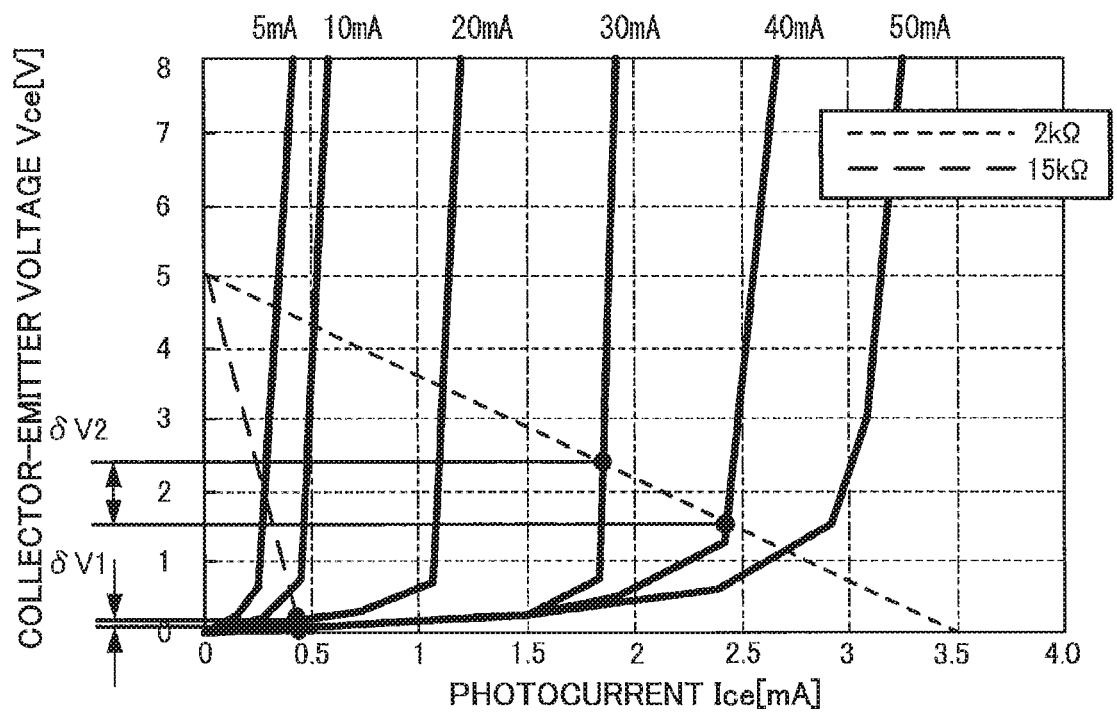
FIG. 6 is a view illustrating a second example of the relationship between the collector-emitter voltage of the photo-interrupter 15 and the photo-current.

Upon receipt of light, the light receiver 15B generates a collector-emitter voltage Vce (see FIGS. 5 and 6), thereby outputting a photo-current Ice (see FIGS. 5 and 6). The photo-current Ice and the collector-to-emitter voltage Vce, which correspond to an intensity of the light received at the light receiver 15B and the resistance value of the resistive section 6, are output. A voltage of (Vcc−Ve) (V) is applied to the wire L3 electrically connected to the resistive section 6.

The ADC 1 detects an analog voltage on the connection point P1 and converts the detected voltage to a digital signal Vp1. The digital signal Vp1 is output to the CPU 21. The analog voltage on the connection point P1 is a voltage (Vce-Vce) which is the voltage Vcc with the voltage Vce subtracted therefrom. Accordingly, the CPU 21 can determine a voltage difference δV (see FIGS. 5 and 6) with respect to the collector-emitter voltage Vce from the photo-interrupter 15, by monitoring a state of the digital signal Vp1. The voltage difference δV is a difference between the collector-emitter voltage Vce when the label S is present on the reception part 35 and the collector-emitter voltage Vce when the label S is not present on the reception part 35.

The ADC 2 detects an analog voltage on the connection point P3 and converts the detected voltage into a digital signal Vp3. The digital signal Vp3 is output to the CPU 21. When the transistor Tr3 is ON, the voltage on the connection point P3 is close to 0 V. When the transistor Tr3 is OFF, the voltage on the connection point P3 is Vcc with Vce subtracted therefrom. Accordingly, the CPU 21 can determine whether the transistor Tr3 is ON or OFF by monitoring a state of the digital signal Vp3. Hence, the CPU 21 can determine the intensity of external light received at the photo-transistor 31.

FIGS. 5 and 6 indicate relationships between collector-emitter voltages Vce and photo-currents Ice for the photo-interrupter 15. Specifically, FIGS. 5 and 6 each indicate, for each of individual forward currents If of 5 mA, 10 mA, 20 mA, 30 mA, 40 mA, and 50 mA through the light emitter 15A, a relationship achieved between the collector-emitter voltage Vce and the photo-current Ice when light emitted from the light emitter 15A is reflected upon the label S and received at the light receiver 15B. Note that label S in this situation is predetermined standard labels for convenience in description.

By referring to FIG. 5, the following describes a suitable situation in which the resistance value of the resistive section 6 is equal to 2 kΩ due to external light with a high intensity. When the label S is not located at the reception part 35, the light receiver 15B receives only external light. In this case, assuming for convenience that the light received at the light receiver 15B has an intensity corresponding to a forward current If of 5 mA to flow through the light emitter 15A, the collector-emitter voltage Vce can be approximately equal to 4.5V. When the label S is located at the reception part 35, the light receiver 15B receives both external light and reflected light from the label S. In this case, assuming for convenience that the light received by the light receiver 15B has an intensity corresponding to a forward current If of 10 mA to flow through the light emitter 15A, the collector-emitter voltage Vce can be approximately equal to 4.3V. As a result, a voltage difference δV1 between the above two cases is approximately equal to 4.5V-4.3 V=0.2V. The CPU 21 could be incapable of distinguishing between the voltage difference δV1 and a voltage variation that could be caused by device errors. Hence, it will be difficult to accurately detect the presence/absence of a label S. Hence, accurate detection the presence/absence of the label S is difficult in the case where the resistance value of the resistive section 6 is set to 2 kΩ when the intensity of light incident on the light receiver 15B is low.

Next, descriptions are given of a situation in which the resistance value of the resistive section 6 is equal to 15 kΩ due to external light with a low intensity. When the label S is not located at the reception part 35, assuming that, as seen in the above description, the light received at the light receiver 15B has the intensity corresponding to the forward current if of 5 mA to flow through the light emitter 15A, the collector-emitter voltage Vce can be approximately equal to 2.0 V. When the label S is located at the reception part 35, assuming that, as seen in the above description, the light received at the light receiver 15B has the intensity corresponding to the forward current If of 10 mA to flow through the light emitter 15A, the collector-emitter voltage Ve can be approximately equal to 0.6 V. As a result, a voltage difference δV2 between the above two cases is approximately equal to 2.0 V-0.6V=1.4V, which is larger than that achieved when the resistance value is 2 kΩ. Hence, the CPU 21 can accurately detect the presence/absence of the label S in the case where the resistance value of the resistive section 6 is set to 15 kΩ when the intensity of light incident on the light receiver 15B.

A threshold A compared with the voltage on the connection point P1 when external light has the low intensity is, for example, 4V. This value of the threshold A is equal to an intermediate value between a voltage (Vcc-Vce) on the wire L3 of 5V-2V=3V (external light) and a voltage (Vcc-Vce) on the wire L3 of 5V-0.6V=4.4V (external light+reflected light). For example, the CPU 21 compares the threshold A stored in the EEPROM 26 with the digital signal Vp1 of the ADC 1. And then, the CPU 21 determines that the label S is not present when the output value of the digital signal Vp1 is lower than the threshold A and determines that the label S is present when the output value of the digital signal Vp1 is equal to or higher than the threshold A.

By referring to FIG. 6, the following describes a suitable situation in which the resistance value of the resistive section 6 is equal to 15 kΩ due to external light with a low intensity. First, a case where the resistance value of the resistive section 6 is set to 15 kΩ will be described. When the label S is not located at the reception part 35, the light receiver 15B receives only external light. In this case, assuming for convenience that the light received by the light receiver 15B has an intensity corresponding to a forward current If of 30 mA to flow through the light emitter 15A, the collector-emitter voltage Ve can be approximately equal to 0.15V. When the label S is located at the reception part 35, the light receiver 15B receives both external light and reflected light from the label S. In this case, assuming for convenience that the light received by the light receiver 15B has an intensity corresponding to a forward current If of 40 mA to flow through the light emitter 15A, the collector-emitter voltage Vce can be approximately equal to 0.1 V. As a result, a voltage difference δV1 between the above two cases is approximately equal to 0.15V— 0.1V=0.05V. Hence, since the voltage difference δV1 is small, accurately detection the presence/absence of the label S is difficult in the case where the resistance value of the resistive section 6 is set to 15 kΩ when the intensity of light incident on the light receiver 15B is high.

Next, descriptions are given of a situation in which the resistance value of the resistive section 6 is equal to 2 kΩ due to external light with a high intensity. When the label S is not located at the reception part 35, assuming that, as seen in the above description, the light received by the light receiver 15B has the intensity corresponding to the forward current If of 30 mA to flow through the light emitter 15A, the collector-emitter voltage Vce can be approximately equal to 2.4 V. When the label S is located at the reception part 35, assuming that, as seen in the above description, the light received by the light receiver 15B has the intensity corresponding to the forward current If of 40 mA to flow through the light emitter 15A, the collector-emitter voltage Vce can be approximately equal to 1.5V. As a result, a voltage difference V2 between the above two cases is approximately equal to 2.4V-1.5V=0.9V, which is larger than that achieved when the resistance value is 15 kΩ. Hence, the CPU 21 can accurately detect the presence/absence of the label S.

A threshold B compared with a voltage on the connection point P1 when external light has the high intensity is, for example, 3V. This value is equal to an intermediate between a voltage (Vcc-Vce) on the wire L3 of 5V-2.4V=2.6V (external light) and a voltage (Vcc-Vce) on the wire L3 of 5V-1.5V=3.5V (external light+reflected light). For example, the CPU 21 compares the threshold B stored in the EEPROM 26 with the digital signal Vp1 of the ADC 1. And then, the CPU 21 determines that the label S is not present when the output value of the digital signal Vp1 is lower than the threshold B and determines that the label S is present when the output value of the digital signal Vp1 is equal to or higher than the threshold B.

<Relationship Between Thickness of Label S and Intensity of External Light>

Figure 7:
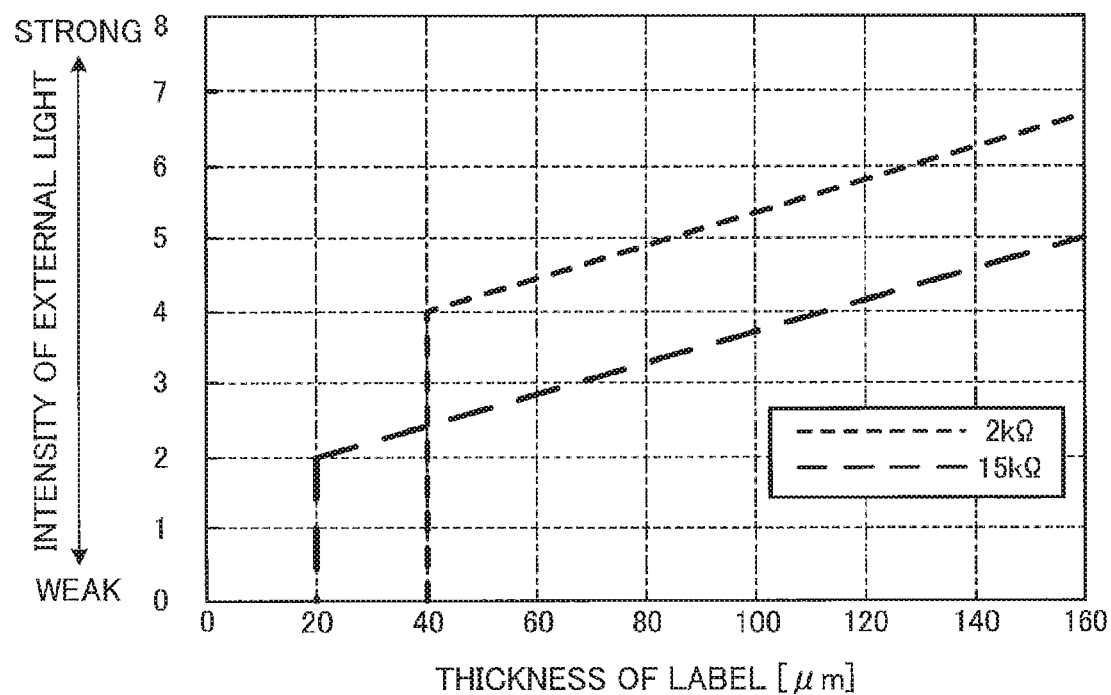
FIG. 7 is a view illustrating the thickness of the label S that can be detected by the label detection circuit 16 with respect to an intensity of external light.

FIG. 7 shows a relationship between the thickness of the label S detectable by the label detection circuit 16 and the intensity of external light when the resistance value of the resistive section 6 of the label detection circuit 16 is set to 15 kΩ and 2 kΩ, respectively. A vertical axis indicates the intensity of external light, and a horizontal axis indicates the thickness of the label S. Note that the intensity of external light is 0 to 8.0 for convenience in description.

First, a case where the resistance value of the resistive section 6 is set to 15 kΩ will be described. For the label S having a thickness of 20 μm, the label detection circuit 16 can detect the label S at intensities of external light up to 2.0. For the label S having a thickness of 40 μm, the label detection circuit 16 can detect the label S at intensities of external light up to 2.4.

In contrast, when the resistance value of the resistive section 6 is set to 2 kΩ, the label detection circuit 16 cannot detect a label S having a thickness of less than 40 μm, irrespective of the intensity of external light.

When the intensity of external light is low, the adjustment circuit 45 of the label detection circuit 16 adjusts the resistance value of the resistive section 6 to 15$k$ in order to accurately determine the presence/absence of the label S. As a result, the sensitivity of the light receiver 15B is enhanced. Hence, the label detection circuit 16 can detect the label S having the thickness less than 40 μm.

For the label S having a thickness of 40 μm, when the resistance value of the resistive section 6 is equal to 15 kΩ, the label S can be detected at intensities of external light up to 2.4, and when the resistance value of the resistive section 6 is equal to 2 kΩ, the label S can be detected at intensities of external light up to 4.0. Accordingly, when the resistance value of the resistive section 6 is equal to 2 kΩ, the label detection circuit 16 can detect the label S at intensities of external light up to about 1.7 times higher than the highest intensity of external light at which the label S can be detected when the resistance value is 15 kΩ. Similarly, for a label S having a thickness of 80 μm, when the resistance value is 2 kΩ, the label detection circuit 16 can detect the label S at intensities of external light up to 4.8, i.e., can detect the label S at intensities of external light up to about 1.6 times higher than the highest intensity of external light at which the label S can be detected when the resistance value is 15 kΩ.

For the label S having a thickness of 120 μm, when the resistance value is 2 kΩ, the label S can be detected at intensities of external light up to 5.8, i.e., the label S can be detected at intensities of external light up to about 1.4 times higher than the highest intensity of external light at which the label S can be detected when the resistance value is 15 kΩ. For the label S having a thickness of 160 μm, when the resistance value is 2 kΩ, the label S can be detected at intensities of external light up to 6.7, i.e., the label S can be detected at intensities of external light up to about 1.3 times higher than the highest intensity of external light at which the label S can be detected when the resistance value is 15 kΩ.

When the intensity of external light is high, the adjustment circuit 45 adjusts the resistance value of the resistive section 6 to 2 kΩ in order to accurately determine the presence/absence of the label S. Thus, the label detection circuit 16 can detect the presence/absence of a label S even when external light having an intensity at which the label S could not be detected if the resistance value of the resistive section 6 was 15 kΩ is received.

As described above, the adjustment circuit 45 switches a resistance value of the resistive section 6 electrically connected to the transistor Tr3 on the basis of the intensity of light detected by the photo-transistor 31. That is, the transistor Tr3 switches the resistance value of the resistive section 6. When, for example, the intensity of external light exceeds 2.4, the adjustment circuit 45 can extend a range of detection by making an adjustment for switching the resistance value of the resistive section 6. Specifically, the adjustment circuit 45 makes a setting to turn off the transistor Tr3 when the intensity of external light is less than 2.4. Adjusting the resistance value of the resistive section 6 to 15 kΩ allows the thin label S with a thickness of 40 μm or less to be detected. The adjustment circuit 45 also makes a setting to turn on the transistor Tr3 when the intensity of external light exceeds 2.4. Adjusting the resistance value of the resistive section 6 to 2 kΩ allows the label S to be detected even when the intensity of external light is high.

<Flowchart>

Figure 8:
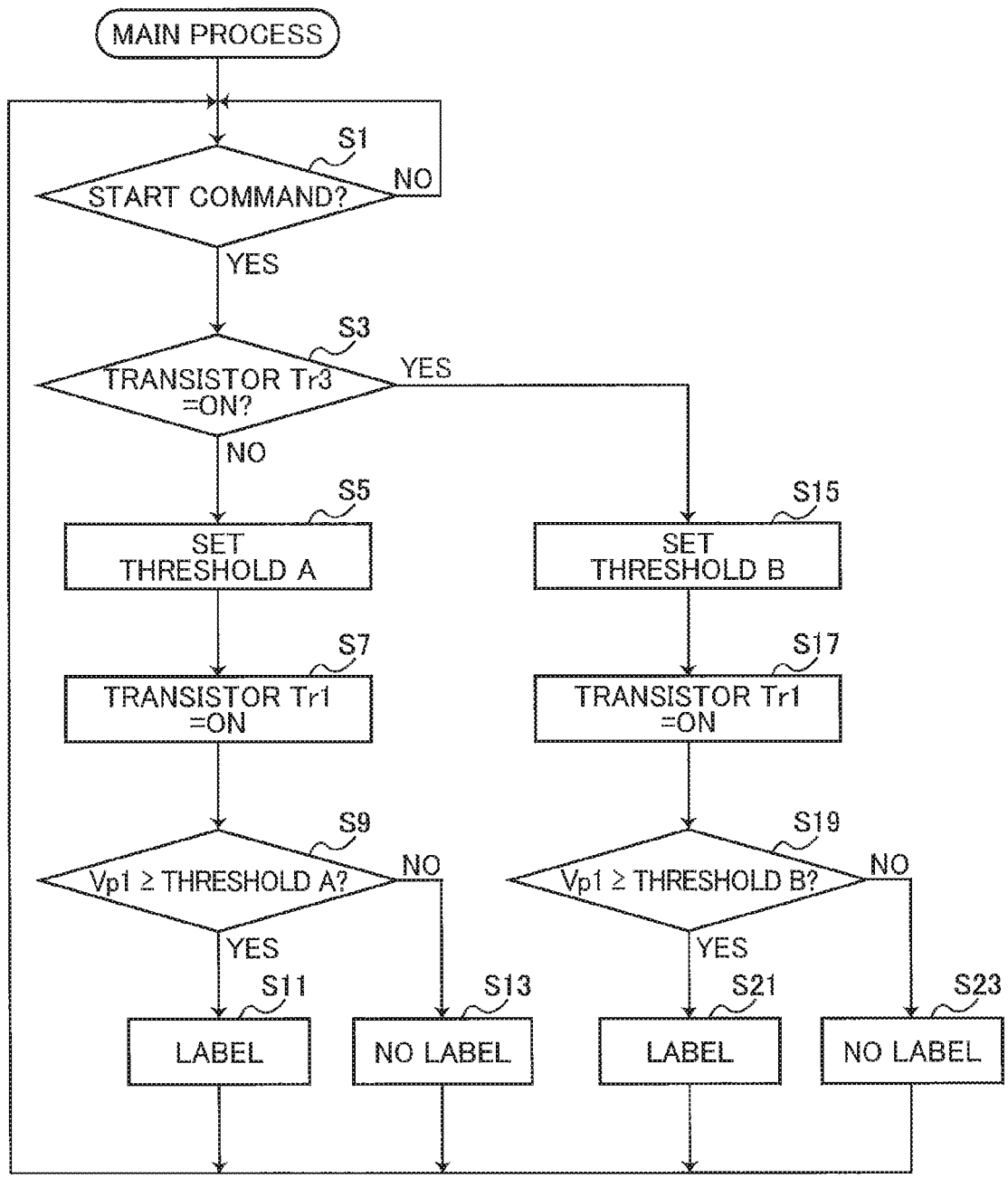
FIG. 8 is a flowchart of a main process.

The following describes a main process by referring to FIG. 8. Upon the printing apparatus 1 being turned on, the CPU 21 reads a program from the ROM 22 and runs the same. The CPU 21 starts the main process by running the program. Upon the main process being started, the CPU 21 determines whether a start command has been input by operating the operation part 14 (S1). When the start command has not been input (S1: NO), the CPU 21 returns the process to S1 and waits for the start command to be input.

When the start command has been input (S1: YES), the CPU 21 determines whether the transistor Tr3 has been turned on (S3). Note that the CPU 21 recognizes the on/off state of the transistor Tr3 by monitoring the digital signal Vp3 of the ADC 2.

When determining that the transistor Tr3 is in the off state (S3: NO), i.e., when the intensity of external light is low, the CPU 21 sets the threshold A (S5). Then, the CPU 21 turns on the transistor Tr1 (S7). Thus, the light emitter 15A of the photo-interrupter 15 emits light. The CPU 21 compares the threshold A with the digital signal Vp1 of the ADC 1 (S9). When determining that the digital signal Vp1 of the ADC 1 is equal to or greater than the threshold A (S9: YES), the CPU 21 determines that a label S is present (S1). The CPU 21 returns the process to S1. When determining that the digital signal Vp1 of the ADC 1 is less than the threshold A (S9: NO), the CPU 21 determines that the label S is not present (S13). The CPU 21 returns the process to S1.

When determining that the transistor Tr3 is in the on state (S3: YES), i.e., when the intensity of external light is high, the CPU 21 sets the threshold B (S15). The CPU 21 switches the transistor Tr1 in the on state (S17). Thus, the light emitter 15A of the photo-interrupter 15 emits light. The CPU 21 compares the threshold B with the digital signal Vp1 of the ADC 1 (S19). When determining that the digital signal Vp1 of the ADC 1 is equal to or greater than the threshold B (S19: YES), the CPU 21 determines that the label S is present (S21). The CPU 21 returns the process to S1. When determining that the digital signal Vp1 is less than the threshold B (S19: NO), the CPU 21 determines that the label S is not present (S23). The CPU 21 returns the process to S1. The process S3 is an example of "switching a threshold value based on the intensity of the external light received at the second light receiving portion". The processes S9 and S19 are an example of "determining the presence of the print medium by comparing the output value of the optical sensor with the threshold value".

Technical Effects of Embodiment

As described above, on a basis of the intensity of external light received by the photo-transistor 31, the adjustment circuit 45 adjusts a sensitivity indicating the level of detection of a label S that is performed by the optical sensor. In other words, the adjustment circuit 45 adjusts the sensitivity of the light receiver 15B on a basis of the intensity of external light detected by the photo-transistor 31. The printing apparatus 1 detects the presence/absence of the label S on a basis of the light receiver 15B with the sensitivity thereof having been adjusted by the adjustment circuit 45. Hence, the printing apparatus 1 can decrease the likelihood of erroneously determining that the label S has been detected due to external light.

The photo-interrupter 15 is provided on the upper surface of the reception part 35 on which the lower surface of the label S ejected from the discharge outlet 32 is received. The photo-transistor 31 is located at one of the outer edge portions 38 located in the vicinity of the light receiver 15B, lying in the same plane as the upper surface of the reception part 35, and spaced apart from the conveying region in the left-right direction perpendicular to the direction in which labels S am conveyed. With this structure, when the label S is not present, the external light detected by the photo-transistor 31 has an essentially equal intensity to external light detected by the light receiver 15B. As a result, the adjustment circuit 45 can accurately adjust the sensitivity of the light receiver 15B.

The photo-transistor 31 includes the collector and emitter terminals switched between the energized state and the non-energized state in accordance with light reception. The adjustment circuit 45 includes the resistive section 6 and the transistor Tr3. The resistive section 6 is electrically connected between the emitter terminal of the light receiver 15B and the ground. The transistor Tr3 switches the resistance value of the resistive section 6. With this structure, the printing apparatus 1 can accurately adjust the sensitivity of the light receiver 15B by controlling the transistor Tr3.

The resistive section 6 includes the resistor R2 and the resistors R3 and R4 arranged in parallel to the resistor R2. The transistor Tr3 switches the combined resistance value of the resistor R2 and the resistors R3 and R4 by switching the transistor R2 between ON and OFF. With this structure, the printing apparatus 1 can switch the combined resistance value of the resistor R2 and the resistors R3 and R4 arranged in parallel to the resistor R2 by the transistor Tr3 simply switching the transistor R2 between ON and OFF.

The printing apparatus 1 includes the transistor Tr3. With this structure, the printing apparatus 1 can switch the resistance value of the resistive section 6 by simply performing on/off control of the transistor Tr3.

The CPU 21 switches between the thresholds A and B on a basis of the intensity of external light received by the photo-transistor 31. The CPU 21 determines the presence/absence of the label S by comparing the digital signal Vp1 of the ADC 1 with the threshold A or B that has been switched to. With this structure, the printing apparatus 1 can determine the presence/absence of a label S in accordance with the intensity of external light.

<Variation>

The present invention is not limited to the abovementioned embodiments and can be subject to various changes. Although the peeing part 30 in the abovementioned embodiment is provided at the front-edge portion of the lower housing 11, the peeling part 30 may be integral with the lower housing 11. The printing apparatus 1 in accordance with the abovementioned embodiment is such that the peeling part 30 peels the label S away from the mount, but the label S may be ejected directly through the discharge outlet 32 without being peeled from the mount. That is, the printing apparatus 1 may be configured to be capable of performing switching as to whether the peeling part 30 is to peel the label S. The printing apparatus 1 may not include the peeling part 30. In this case, the photo-interrupter 15 and the photo-transistor 31 may be provided at the lower housing 11.

The photo-interrupter 15 is located essentially at the center of the reception part 35 in the left-right direction. However, as long as the photo-interrupter 15 is located under the ejected label S, the photo-interrupter 15 may be located to the left or right of the center. Although the photo-interrupter 15 is provided downstream from the discharge outlet 32 in the conveying direction, the photo-interrupter 15 may be provided upstream from the discharge outlet 32 or immediately below the discharge outlet 32.

The photo-transistor 31 is provided at one of the outer edge portions 38 but may be disposed at another position. Specifically, the photo-transistor 31 may be disposed at any position as long as the photo-transistor 31 can receive external light having an essentially equal intensity to external light received by the light receiver 15B of the photo-interrupter 15. The resistive section 6 includes the three resistors R2, R3, and R4 but may include three or more resistors or three or less resistors. The resistive section 6 may include a variable resistor.

The adjustment circuit 45 switches the resistance value between 2 kΩ and 15 kΩ but may be configured to set the resistance value to 10 kΩ. The adjustment circuit 45 may be configured to be capable of changing the resistance value continuously. The transistor Tr3 is directly connected to the photo-transistor 31 but may not be connected thereto. In this case, the CPU 21 may directly detect the intensity of external light received by the photo-transistor 31 and perform the on/off control of the transistor Tr3 on a basis of the detected intensity of external light.

Although the ADC 1 measures the voltage on the connection point P1, the configuration for measurement of a voltage is not limited to this. Besides an input range of the ADC 1, voltages on appropriate portions may be measured. For example, the ADC 1 may detect a voltage on the connection point P2 between the resistors R3 and R4. In this case, a threshold to be compared with the voltage may be set as appropriate. The ADC 2 may not be provided.

While the description has been made in detail with reference to specific embodiment(s) thereof, it would be apparent to those skilled in the art that various changes and modifications may be made therein without departing from the spirit and scope of the above described embodiment(s).

What is claimed is:

1. A printing apparatus comprising:
   a casing formed with an outlet for discharging a printing medium;
   an optical sensor comprising a light emitting portion and a first light receiving portion, the optical sensor being configured to detect a presence of the print medium, the optical sensor being provided at a position in the vicinity of the outlet and located within a conveying region, the conveying region being an area through which the print medium passes;
   a second light receiving portion provided in the vicinity of the optical sensor, the second light receiving portion being configured to receive external light, the second light receiving portion being positioned outside the conveying region so as to receive the external light, the second light receiving portion not facing the printing medium; and
   an adjustment part configured to adjust a sensitivity in the detection of the presence of the print medium by the first light receiving portion, adjustment of the sensitivity of the first light receiving portion being performed based on an intensity of the external light received at the second light receiving portion.

2. The printing apparatus according to claim 1, further comprising a reception part and an outer edge portion, the reception part including an upper surface, the reception part being provided so that the upper surface thereof receives a lower surface of the print medium discharged from the outlet, the outer edge portion being provided in the vicinity of the first light receiving portion and spaced apart from the conveying region in a direction perpendicular to a conveying direction of the print medium, the outer edge portion including an upper surface in flush with the upper surface of the reception part, and wherein the first light receiving portion is provided at the upper surface of the reception part, and wherein the second light receiving portion is provided at the upper surface of the outer edge portion.

3. The printing apparatus according to claim 1, wherein the first light receiving portion comprises a pair of terminals that is switched between a conductive state and a non-conductive state, wherein the adjustment part comprises:

a resistive section electrically connected between one of the pair of terminals and ground; and a switching section configured to switch a resistance value of the resistive section.

4. The printing apparatus according to claim 3, wherein the resistive section comprises a first resistor and a second resistor connected in parallel to the first resistor, and wherein a combined resistance value of the first resistor and the second resistor is switched by switching the state of the first resistor between an enabled state and a disabled state.

5. The printing apparatus according to claim 3, wherein the switching section comprises a transistor.

6. The printing apparatus according to claim 1, further comprising a controller configured to perform:

switching a threshold value based on the intensity of the external light received at the second light receiving portion; and determining the presence of the print medium by comparing the output value of the optical sensor with the threshold value.

7. A printing apparatus comprising:

a casing formed with an outlet for discharging a printing medium;

a printing part configured to print on a plurality of labels as the printing medium continuously attached to an elongated mount;

a peeling part provided in the vicinity of the outlet and configured to peel off the label from the mount;

a reflective optical sensor comprising a light emitting portion and a first light receiving portion and configured to detect a presence of the label, the reflective optical sensor being provided at a position within a label region, the label region being an area in which the label peeled away from the mount is positioned;

a second light receiving portion provided in the vicinity of the optical sensor, the second light receiving portion being configured to receive external light, the second light receiving portion being provided outside the label region and positioned such that the external light can be received, the second light receiving portion not facing the printing medium; and an adjustment part configured to adjust a sensitivity of the first light receiving portion based on the intensity of the external light received at the second light receiving portion.

* * * * *